United States Patent [19]
Moltgen

[11] 3,900,792
[45] Aug. 19, 1975

[54] METHOD AND APPARATUS FOR GENERATING REACTIVE POWER

[75] Inventor: Gottfried Möltgen, Erlangen, Germany

[73] Assignee: Siemens Aktiengesellschaft, Munich, Germany

[22] Filed: Jan. 3, 1974

[21] Appl. No.: 430,569

[30] Foreign Application Priority Data
Jan. 5, 1973  Germany............................ 2300445

[52] U.S. Cl. ................. 323/102; 323/119; 323/127
[51] Int. Cl. ............................................ H02j 3/18
[58] Field of Search........... 321/27 R; 323/102, 105, 323/108, 109, 119, 127, 128

[56] References Cited
UNITED STATES PATENTS

| | | | |
|---|---|---|---|
| 3,450,983 | 6/1969 | Koppelmann et al............... | 323/119 |
| 3,551,799 | 12/1970 | Koppelmann.................... | 323/127 X |
| 3,622,861 | 11/1971 | Boksjo .............................. | 321/27 R |
| 3,740,638 | 6/1973 | Thorborg........................ | 323/119 X |
| 3,768,001 | 10/1973 | Thorborg...................... | 323/119 UX |

*Primary Examiner*—A. D. Pellinen
*Attorney, Agent, or Firm*—Kenyon & Kenyon Reilly Carr & Chapin

[57] ABSTRACT

An improved method and apparatus for generating reactive power in an installation which includes a capacitor bank and two controlled converters connected to an A-C system of at least one phase in which the two controlled converters are coupled to each other on their DC sides through a smoothing choke with the converters controlled in a control range with a differing control angles. In the present invention, the control angles of both converters are controlled in such a manner that their sum is always smaller by a predetermined amount than a 180° thereby permitting simpler control and a reduced size of smoothing coil to be used.

11 Claims, 4 Drawing Figures

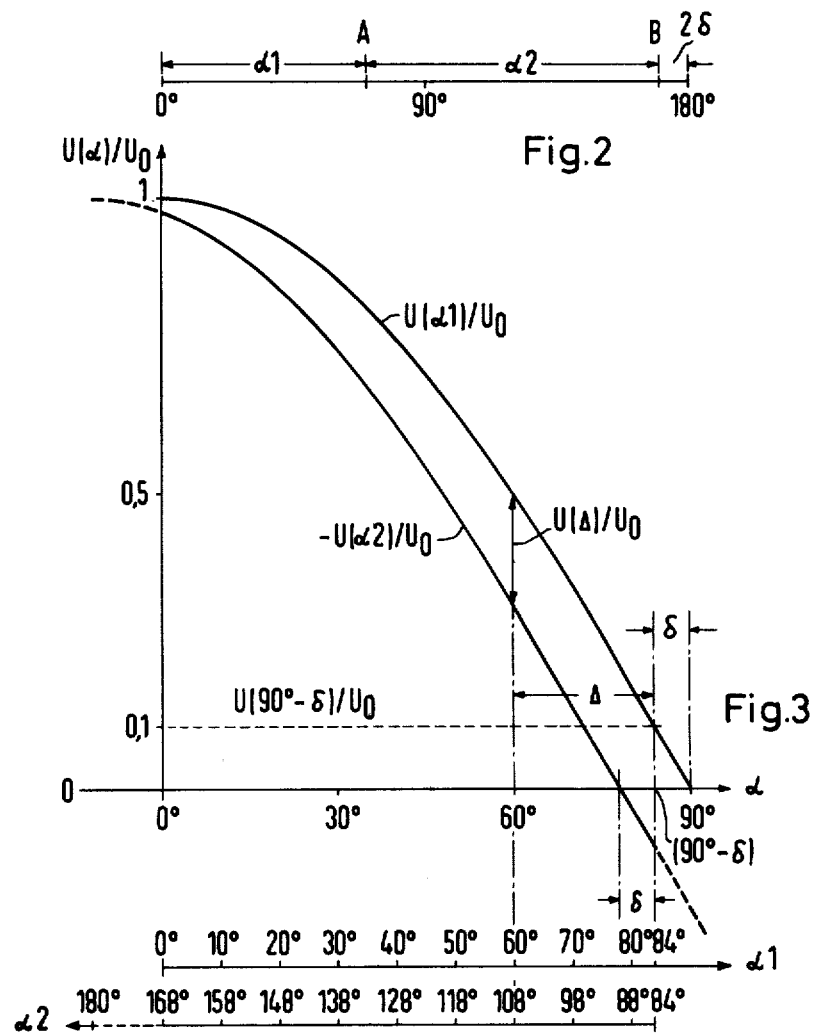
Fig.2
Fig.3
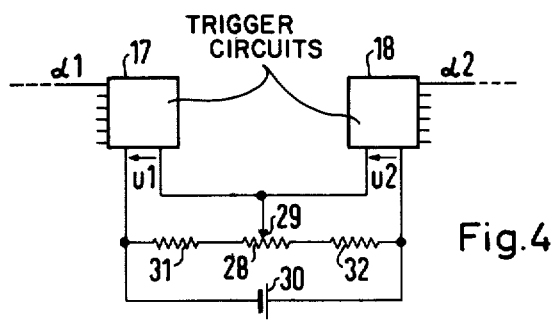
Fig.4

3,900,792

1

METHOD AND APPARATUS FOR GENERATING REACTIVE POWER

BACKGROUND OF THE INVENTION

This invention relates to installations for generating reactive power in general and more particularly to such an installation which is simpler and easier to operate than those previously used.

Arrangements for generating reactive power are known in which a capacitor bank is connected to the A-C line and along with it two controlled converters which have their D-C sides connected with a smoothing choke. The converters are controlled in their control range using different control angles. Such arrangements are often used as a reactive load having low losses and which is fast and can be adjusted in a simple manner within wide limits. The converter arrangement is used to compensate for inductive reactive loads as quickly as possible, particularly in "weak" A-C systems. In such systems, it is common to have a capacitor bank installation of fixed capacity which is shunted by the converter arrangement which is used for absorbing reactive power. The compensating effect of the capacitor installation is cancelled by the arrangement for generating reactive power as long as the system is demanding no reactive power. If however, such a reactive power demand suddenly occurs in the operation of loads connected to the A-C system, the capacitive effect of the overall arrangement is rapidly adjusted using electronic controlled devices associated with the converts such that the inductive reactive load of the system is just compensated. In this manner it is possible to maintain a unity power factor under various conditions of load.

One type of device which is used for such compensation is a line controlled converter which is short circuited with a smoothing coil. Such an arrangement corresponds to a choke with a variable inductance. With the exception of small ohmic losses, a device of this nature represents an almost purely inductive load whose magnitude is proportional to the D-C current flowing in the smoothing choke. The D-C current magnitude can be varied as desired through the controlled rectifiers of the converter as long as the D-C current curve has no interruptions, which must be insured by the smoothing choke. Typically, in a three phase system, a twelve pulse converter is selected particularly in larger installations. This is usually in the form of a series circuit on a D-C side consisting of two six pulse converters having control angles differing by 30°.

The primary disadvantage in an arrangement such as this wherein the converter is short circuited by a smoothing choke which must insure operation without interruption over the entire range of D-C currents, particularly at low currents, is the smoothing choke itself which must be of considerable size since losses must be kept low. A further disadvantage is that the control range of the converter in a short circuited condition is only a few electrical degrees. This necessitates extremely accurate control units, and requires fine adjustment in the control range of for example 86° el plus or minus 2° el. Finally, the rectifier currents must not become temporarily excessive during control operations. To avoid such, and as a compromise, the smoothing choke is selected to be larger than would be necessary in principle. This in turn results in an effective time constant in a D-C circuit of 100 milliseconds or more.

2

The type of method and arrangement described above are disclosed in German Offenlegungsshrift 2,201,800. The arrangement includes a first and a second line commutated converter having A-C taps connected to an A-C system. The converters are connected in an anti-parallel manner on the D-C side, each through an essentially resistanceless smoothing choke without taps in each connecting line. In addition, a battery of capacitors is also connected to the A-C system.

The control units of the two converters are controlled in such a manner that they transmit ignition pulses to the rectifiers such that the rectifier of the second converter fires after a delay relative to the first converter. This delay is the same for all rectifiers of the second converter as referred to corresponding rectifiers of the first converter. This delay may be constant or may be variable. The first converter, which operates as a rectifier is adjusted to a first control angle $\alpha 1 = \alpha$. The second converter which operates as an inverter is adjusted to a control angle $\alpha 2 = \alpha + \Delta \alpha$. The angle $\Delta \alpha$ corresponds to the above mentioned delay. D-C voltages of both converters are of approximately equal magnitude and opposite direction, the sum of both control angles is $\alpha 1 + \alpha 2 = 180°$. From this it can be said that: $\alpha 1 = (90° - \Delta \alpha/2)$ and $\alpha 2 = (90° + \Delta \alpha /2.)$ In order that an appreciable D-C current can flow, it is necessary that the control angle $\alpha 1$ be slightly less than the above mentioned value of $90° - \Delta \alpha /2$.

Furthermore, the angle $\alpha$ can be varied in a reactive power control circuit such that the reactive power is kept constant. The control angles $\alpha 1$ and $\alpha 2$ are generally varied in the same sense, i.e., they are both either increased or decreased simultaneously. Decreasing the angle $\alpha$ results in an increased D-C current in the two smoothing chokes and an increase of in reactive power is produced. The deviation of the control angles $\alpha 1$ and $\alpha 2$ from the above values is very slight. The principle behind this method of operation is that through an appropriate choice of the angle $\alpha$ an operating condition will exist in which harmonics of the current on the system side of the arrangement becomes a minimum, which can be achieved with an angle $\alpha$ of 75° for the fifth and seventh harmonics. Again, a very small change in angle $\alpha$ will result in a large change of D-C current flowing through smoothing choke. Thus, special control devices having fine adjustment must also be used. Furthermore, the smoothing chokes must be of considerable size which is a disadvantage in regard to material expenditure, costs and weight. Thus, it can be seen that there is a need for an improved method of operating compensating devices of this nature such that conventional control devices and smaller chokes may be used. In addition, the method should not be tied to the time constant in the D-C circuit but rather be independent thereof.

SUMMARY OF THE INVENTION

The present invention solves the above noted problems. By controlling the control angles $\alpha 1$ and $\alpha 2$ of the two converters such a manner that their sum is always smaller than 180° by a predetermined angle 2 $\delta$. For the control angles $\alpha 1$ and $\alpha 2$ of the two converters the relationship $\alpha 1 + \alpha 2 = 180° - 2 \delta$ therefore is always true. Generally, the predetermined angle 2 $\delta$ will be smaller than 90°. It is most advisable to choose the predetermined angle 2 $\delta$ so that for equal control angles, i.e., for $\alpha 1 > \alpha 2$ a D-C current will flow through the smoothing choke which corresponds to the highest value of the reactive load which must be compensated by the two converters. This angle need only be set once for the arrangement. Once the adjustment is made, the D-C current cannot become larger than that corresponding to the predetermined angle 2 δ, regardless of whether a control or regulator is involved. Thus, the current is effectively liimited to this value. According to the present invention, the arrangement used in the generation of reactive power is characterized by the feature that each converter is equipped with a transformer winding on the rectifier side and is connected in series on the D-C side to a smoothing choke. Furthermore, the control voltages of the control units of both converters are adapted so that they can be varied by the same amount in opposite directions starting out of a predetermined value. Preferably, two control units of identical design will be used, each being of the conventional type in which the control angle α is proportional to the control voltage.

Thus, the invention is based on the fact that not only will a short circuited converter represent a reactive load but that an open circuited inverting converter, which is equivalent to two connected conneted converters will also represent a reactive load for the system due to its circulating current. With an exact relationship between a control angle α 1 and α 2 of both converters which corresponds to the sum of the angles equalling 180°, the circulating current is thereby fixed for the amount of drive and the size of the smoothing choke. The invention is based on the fact that it is possible without difficulty to increase the circulating current using a D-C component which is adjustable at will by the amount of the angle 2 δ which is used in slightly reducing the sum of the angles α 1 + α 2 below 180°. Since it is possible to bring the magnitude of a circulating current adjusted in this manner into a reasonable common dependence on the control angles α 1 and α 2, and furthermore that this can be done over the entire possible rectifier control range of 0° <α1 <(90°− u/2) where u is the overlapped angle for zero drive, which is obtained from the commutation reactance, the above mentioned difficulty encountered with a control unit with extremely small control range is thereby eliminated and ordinary control units well known in the art may be used. With this type of control, the smoothing choke needs only insure that the D-C current which flows for equal control angles α 1 = α 2 =(90° − δ ) have no interruptions. This is important in the design of the smoothing choke. Additional advantageous embodiments of the invention are illustrated in the drawings and description which follows.

BRIEF DESCRIPTION OF THE DRAWINGS

FIG. 2 is a graph illustrating the relationship between control angles.

FIG. 3 is a plot of the terminal voltages of the two converters versus the corresponding control angles.

FIG. 4 is a schematic diagram of a control device for controlling the two control voltages in opposite directions according to the present invention.

DETAILED DESCRIPTION OF THE PREFERRED EMBODIMENT

Figure 1:
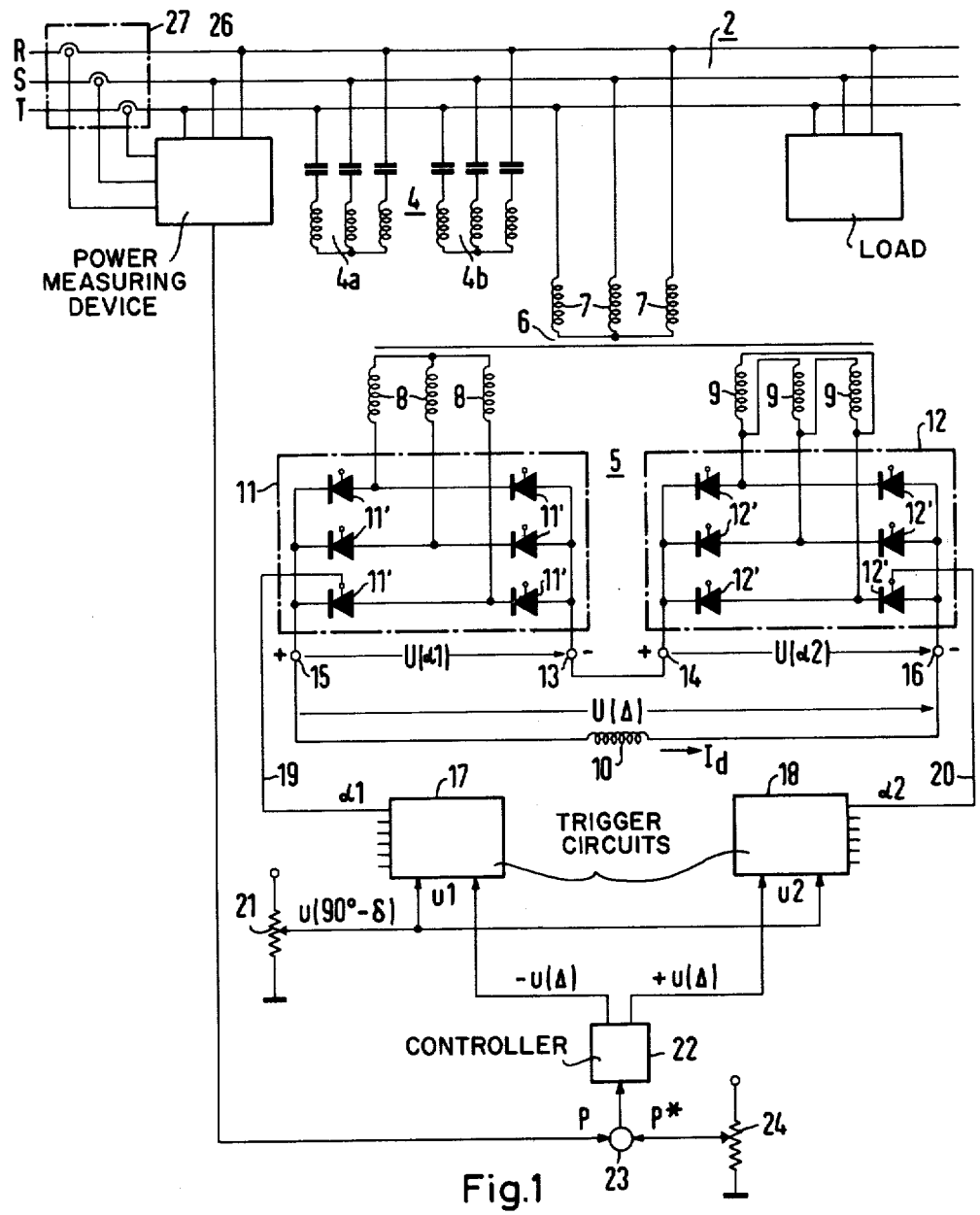
FIG. 1 is a schematic diagram of a reactive power generating arrangement according to the present invention.

FIG. 1 is a schematic diagram of a compensation arrangement for use in compensating reactive load transients in a three phase system designated 2. The three conductors of the three phase system 2 are designated as R, S and T and have connected thereto a three phase load 3 which may for example, be an arc melting installation of large power rating which causes reactive load transients when operating. In well known fashion, there must be compensated in an attempt to maintain a unity power factor to avoid interfering with other consumers connected to the three phase line.

Such compensation is provided by the three phase capacitor installation 4 which is of fixed capacity and by the device 5 which consumes reactive power, i.e., a reactive load, with the capacitor installation and device 5 being connected in parallel across the three phase system. The effect of device 5 is that of an inductive load with variable inductance and, as will be explained in detail below, the device 5 is adjusted using a control circuit so that the inductors of load 3 and that of the device 5 taken together always correspond to the capacity installation 4. In this manner, the power factor of the system in the system 2 can always be maintained at a fixed value which is as close to unity as is desired. In the illustrated embodiment, the capacitor installation 4 is expanded by two filter circuits designated 4a and 4b which are tuned, for example, to the fifth and seventh harmonics. It should be noted that more than two filter circuits and also that further capacitors may also be provided.

As is illustrated, that the device 5 comprises a transformer 6 having its primary windings 7 connected to the three phase system 2 and two sets of secondary windings 8 and 9 connected to the rectifiers of converters 11 and 12 respectively. The converters 11 and 12 are of identical and conventional design each including 6 controlled rectifiers. If the windings 8 are wye connected and the windings 9 delta connected then 12 pulse converter operation is obtained for equal control angles α1=α2 with the angles 60 1 and α 2 being the respective control angles for converters 11 and 12. The converters 11 and 12 are connected together on their D-C side at terminals 13 and 14. D-C terminals 15 and 16 are coupled through a single smoothing choke 10. A second smoothing choke is not required. As indicated above, each of the converters 11 and 12 contains six controlled rectifiers designated respectively 11' and 12' arranged in a three phase bridge circuit. In particular, thyristors can be used as the controlled rectifiers 11' and 12'. Each of the converters 11 and 12 is operated in 6 pulse mode in well known fashion.

Firing pulses for the converter 11 are provided by a control unit 17 which has an input a control voltage u 1. The control voltage u 1 determines the control angle α 1 for the first converter in well known fashion. For the sake of clarity, only a single control line 19 between the control unit 17 and one of the controlled rectifiers 11 is shown. In similar fashion, a controlled rectifier 12' of the second converter receive firing pulses from an identical control unit of 18 which has as its input a control u2. Again, only a single control line 20 is shown for the sake of clarity. Furthermore, in the manner described in connection with control unit 17, the control voltage u 2 determines the control angle α 2 of the second converter 12.

FIG. 2 is a graph illustrating schematically the manner in which the converters 11 and 12 are controlled. Shown is an angle axis extending between 0° and 180°. The control angles α 1 and α 2 of the respective converters 11 and 12 are controlled according to the principles of the present invention, such that their sum |α 1+α 2| is always smaller than 180° by a predetermined angular amount equal to 2δ. This is expressed as follows:

$$\alpha 1 + \alpha 2 = 180° - \delta\ 2\delta \quad (1)$$

In other words, the point A on the graph can move in both directions on the angle axis with point B remaining fixed. Movement of point A to the right will result in an increase of control angle α 1 and a decrease of control angle α 2 by the same amount. The relationship of the equation (1) above holds throughout this movement. As will be discussed below, the movement of the point A may take place in dependence on a control quantity.

As shown on FIG. 2, the control angle α 1 is smaller than 90°. That is, the first converter 11 will operate as a rectifier. The control angle α 2 of the second converter is greater than 90° and therefore the second converter 12 will operate as an inverter in the illustrated embodiment.

FIG. 3 is a graph helpful in further understanding the operation according to the present invention. In the graph, the following values have been assumed by way of an example:

$$2\ \delta = 12°, \alpha 1 = 60°, \alpha 2 = 108°, \Delta = 24°.$$

In actual operation of the system, the amount of the angle 2δ will generally be smaller than 12. It is further assumed that the converters 11 and 12 and their control units 17 and 18 are designed in a manner well known in the art such that the output voltage u (α) is proportional to cosine α where α is the control angle. This is illustrated on FIG. 3 by the curve U (α₁) /U₀ with respect to the angular axis α. The curve continues as the cosine function into negative values beyond the angle α = 90 °, but this portion is not shown.

The value of the angle 2 δ is determined the following manner: The same control angle α is chosen for both converters 11 and 12 so that:

$$\alpha 1 = \alpha\ 2 \quad (2)$$

The control α = α 2 is changed until a D-C current $I_d$ is obtained through the smoothing choke 10 which corresponds to the largest required reactive load value. The value of 2₁ is then obtained from the following equation:

$$\alpha\ 1 = \alpha\ 2 = 90° - \delta \quad (3)$$

Through this equation half of the angle 2 δ is thus determined. Each converter 11 and 12 will deliver an output voltage as follows:

$$U'(\alpha 1) = U'(\alpha\ 2) = U(90° - \delta) \quad (4)$$

[Here, and in the following, the quantities in the parenthesis do not indicate multiplications but are used as a functional notation. That is U(α1) means U of α1. At the smoothing choke, there will appear twice the output voltage U [90°− δ ]. That is, the voltage 2 U (90°90 °−δ). In the numerical example shown on FIG. 3, α1 = α 2 = 84° was selected as the control angle with δ = 6 °as half the amount of the angle 2 δ. Thus, approximately 0.1 is obtained as the relative output voltage for U (90°− δ .) The value of half the angle amount δ is fixed by the effective commutation reactance of each of the converters 11 and 12 with all ohmic resistances of the entire arrangement 5 and with the forward voltage of the rectifiers 11' and 12' respectively considered. In order to reduce the value of reactive power from that obtained with the predetermined angular amount 2 δ, it would be possible to increase the control angles α 1 and α 2 of both converters 11 and 12 in the same direction in the manner described in connection with the prior art. This method however, is not preferred. Rather, the angle (90 °− δ) is considered as the common reference point for both control angles α 1 and α 2 from which the angles α 1 and α 2 are changed in opposite directions by the same angle Δ. The angle Δ thus, is always taken from (90 °− δ) in the positive and negative directions. This is illustrated on FIG. 3 by the two abscissas for the control angles α 1 and α 2. The abscissa for the control angle α 1 goes from left to right, from the angle 0 °to the angle (90 °− δ) = 84°84°. It is associated with the curve U (α 1)/U₀. Thus, the first converter 11 is operated as a rectifier over the entire control range. The abscissa associated with the control angle α goes from the angle (90 °− δ) = 84° to the left increasing to the angle (180°−2 δ) =168 °. It is associated with the negatively plotted curve − U (α 2)/U₀. Thus, the second converter is essentially operated as an inverter within the control angle. The angle Δ may lie anywhere between the limits of 0 ° ≤ Δ ≤ (90 °− δ) as required. The two control angles may thus be described as follows:

$$\alpha 1 = 90° - \delta - \Delta$$

and $$\alpha 2 = 90° - \delta + \Delta \quad (5)$$

Thus, the control angle α 1 is varied between the limits of 0 °and (90 °− δ) and the control angle α 2 within the limits of (90 °− δ) and (180 °− 2 δ). Except for the control range limit (90 °− δ), the two control angles α1 and α 2 are always different. As noted above, the control angles α 1 and α 2 can be varied by the same angular amount Δ in opposite directions starting at the fixed value 90 °− δ.

With reference to the arrangement 5 of FIG. 1, this means that the control units 17 and 18 transmit firing pulses to the main rectifiers 11' and 12' of the converters 11 and 12 in such a manner that one rectifier 11' of the first converter 11 is fired with an adjustable lead relative to a predetermined point in time and that the corresponding rectifier 12' of the converter 12 is fired with a lag relative to that predetermined point in time, with the lag of the second converter 12 being equal to the lead associated with the first converter 11. The same relationship holds for each of the six corresponding valves 11' and 12' of the two converters 11 and 12. Lead and lag are the same for all rectifiers and are visible by the same amount.

The presentation as illustrated in FIG. 3 is particularly helpful in illustrating the present invention since from it the resulting voltage:

$$U'(\Delta) = U'(\alpha 1) + U'(\alpha 2) \quad (6)$$

of the two converters 11 and 12 and thus the corresponding degree of drive of both converters 11 and 12 can be directly measured. The relative resulting voltage U ( Δ )/U₀ is shown on FIG. 3 by the double arrow. With the relationships illustrated by the equations (5)

and (6) as well as taking into account the known and above described proportionality of the degree of drive of the converters 11 and 12 with the cosine of the control angles $\alpha 1$ and $\alpha 2$, the following equations are obtained:

$$U(\Delta) = U_o (\cos \alpha 1 + \cos \alpha 2) = U_o [\cos (90° - \delta - \Delta) + \cos (90° - \delta + \Delta)] U(\Delta)/U_o = 2 \sin \delta \cos \Delta \quad (7)$$

In the numerical example with $\Delta = 24°$ and $\delta = 6°$ one obtains approximately 0.19 for this ratio. The resulting voltage $U(\Delta)$ at the smoothing choke 10 can be set by changing the angle $\Delta$ according to the relationship shown in equation (7). In turn D-C current $I_d$ is also adjusted. Such a change of setting in the D-C $I_d$ results in a change in the amplitude of the D-C curent which flows from the three phase system into the device 5. The phase of this D-C current remains unchanged, i.e., it lags by 90° with respect to line voltage. As seen from the three phase system 2, the device 5 thus, has the characteristic of a choke with a variable inductance.

It can be seen from FIG. 3 that the ratio $U(\Delta)/U_o$ is smaller with increasing angle $\Delta$, (a scissor affect) although it never becomes completely zero. However, if $U(\Delta)$ becomes exactly equal to the forward voltage of the rectifiers 11' and 12' with the increased $\Delta$, the D-C current $I_d$ and the reactive power amost reach a zero value. Only a small current with interruptions will remain.

Control of the type described in connection with FIGS. 2 and 3 is easily implemented with two control units 17 and 18 of identical design. In these control units which are of conventional design, the control angles $\alpha 1$ and $\alpha 2$ are directly proportional to the control voltage of $u 1$ and $u 2$ respectively. The control voltage $u1$ and $u 2$ are D-C voltages. As illustrated on FIG. 1, these control voltages $u1$ and $u 2$ may consist of two separate components. That is, a fixed control voltage component $u(90° - \delta)$ and a variable control component $-u(\Delta)$ or $+u(\Delta)$. The fixed control voltage component $u(90° - \delta)$ corresponds to the angle $(90° - \delta)$ and has the same magnitude for both control units 17 and 18. It can be set as the starting value through the use of a setting device 21 which in the illustrated embodiment, is shown as a potentiometer.

The variable control voltage components $-u(\Delta)$ and $30 u(\Delta)$ correspond to the angle $\Delta$ and have the same magnitude for both control units 17 and 18 but with opposite signs. In the control unit 17 the variable components $-u(\Delta)$ is superimposed on the fixed control voltage component $u(90° - \delta)$ to obtain the control voltage $u 1$. Similarly the variable control voltage component $+ u(\Delta)$ is superimposed on fixed control voltage component $u(90° - \delta)$ in the control unit 18 to form the control voltage $u 2$. Such combination may be done in an extremely simplified manner through the use of a summing amplifier at the inputs of the control units 17 and 18 respectively.

Preferably, the two control voltage components $+ u(\Delta)$ and $- u(\Delta)$ can be taken from the same circuit element. Such may be, for example, the arrangement shown in FIG. 4 or a control member such as the integrating controller 22 of FIG. 1.

As illustrated in FIG. 1, the control voltages $u 1$ and $u 2$ of the control units 17 and 18 are controlled in an reactive power control circuit as a function of the deviation between a nominal reactive power value $P^*$ and an actual reactive value $P$. A summing junction 23 is provided at which the difference $P^* - P$ is determined, and the output thereof provided as the input to an integral controller 22. As is well known, the summing junction and controller 22 can be combined in a single element. That is, they can be an integrator comprised of an operational amplifier with capacitive feedback and with one of the inputs provided to its inverting input and the other to its non-inverting input in order to provide its desired subtraction. As illustrated, the desired $P^*$ may be supplied by reference value transmitter 24 shown on the drawing as a potentiometer. The actual reactive power value $P$ is determined using a conventional measuring device 25 which has as inputs voltages proportional to the line current obtained from current transformers 27 along with the supply voltages themselves obtained from taps or voltage transformers 26 at the three phase line. Any difference between the desired value $P^*$ and the measured value $P$ will result in the controller 22 integrating up or down to change the outputs $- u(\Delta)$ and $+ u(\Delta)$. In this regard, the controller 22 should be a device capable of providing symmetrical outputs. These values will change until a steady state is reached where the value $P^*$ iand $P$ are equal. The control voltages will remain there until a system change again occurs disturbing the eqality of the inputs to the controller 22 which will then integrate up or down again to reestablish this point.

In the embodiment of FIG. 4, a second manner of regulating the control voltages $u 1$ and $u 2$ is illustrated. As shown, a potentiometer 28 having a slider 29 is provided, with the potentiometer being supplied by a voltage source 30. In the center position, which corresponds to the angle $(90° - \delta)$, the outputs to the control units 17 and 18 will be equal. In this position, each control unit receives half of the voltage of the voltage source 30. Both control voltages start out from this fixed value. If the slider is now moved right or left, the two control voltages $u 1$ and $u 2$ are then changed from the fixed value by the same amount in opposite directions. To limit the control ranges, resistors 31 and 32 of equal resistance may also be provided on each side of the potentiometer. If it is required that each of the two control units 17 and 18 have one input lead grounded, two potentiometers coupled with their sliders in opposite senses can be used, with both potentiometers supplied from the same voltages source. The slider 29 of the potentiometer 28 may be positioned in response to a control signal such as that associated with the controller 22 of FIG. 1 using a servo system in a conventinal manner.

A particular advantage of the above described method is in the fact that in operating the device 5 all control processes for the D-C current $I_d$ have been eliminated thereby increasing the operational liability of the system. As compared to prior art arrangements only a single smoothing choke 10 is required. The method can be used only for reactive power compensation in a three phase system, but also in single phase systems. Finally, it should be emphasized that the inductance of the smoothing choke 10 can be quite small. If its inductance is chosen exactly so that for the highest required value of the D-C current $I_d$ with $\alpha 1$ equal to $\alpha 2$, it just prevents interrupted current, it will do so over the entire control range determined by the angle $\Delta$. This is the case since $I_d$ becomes smaller in accordance with the relations for circulating currents to the degree of drive as shown in a textbook by G. Möltgen entitled "Line Commutated Thyristor Converters", edited and published by Siemans Aktiengesellschaft, Berlin - Munich, Pitman Publishing, London, 1972, page 323, FIG. 228, curve 3. The method of the present invention thus leads to savings of cost and weight with respect to the smoothing choke as compared to other known methods. Further, it permits the use of conventional control units. For practical purposes, the time constant in the D-C circuit which is determined by the inductance of the smoothing choke 10 can be as small as desired.

Thus, an improved method and apparatus for generating reactive power has been shown. Although specific embodiments and methods of operation have been illustrated and described, it will be obvious to those skilled in the art that various modifications may be made without departing from the spirit of the invention which is intended to be limited solely by the appended claims.

What is claimed is:

1. A method for the operation of an arrangment for generating reactive power, which arrangment includes a capacitor installation and two controlled converters, each connected to an A-C system having at least one phase, with the two controlled converters connected to each other on the D-C side through a smoothing choke and wherein the converters are controlled in a control range with control angles which differ from each other, except for a common control range limit comprising the steps of controlling the control angles of the two converters such that their sum is always smaller than 180 by a predetermined angular amount.

2. The method according to claim 1 wherein the predetermined angular amount is chosen so that for equal control angles a D-C current corresponding to the largest required value of reactive load flows through the smoothing choke.

3. An arrangement for the generation of reactive power in an A-C system having at least one phase and which includes a capacitor installation across the A-C system comprising:
   a. first and second controlled converters connected in series on their D-C side through a smoothing choke;
   b. a transformer having its primary winding coupled to said first and second converters;
   c. first and second control units providing firing pulses to said first and second converters respectively; and
   d. means to provide first and second control voltages to said first and second control units, said means providing control voltage outputs which vary from a first predetermined value by the same amount in opposite directions.

4. The arrangement according to claim 3 wherein said first and second control voltages each consist of a fixed control voltage component which is the same for both and a superimposed variable control voltage component which is the same absolute magnitude but of opposite sign for both and wherein said variable voltage components are variable from zero to a second predetermined value.

5. The arrangment according to claim 4 and further including means for adjusting said fixed control voltage component.

6. The arrangement according to claim 4 wherein each of said control units includes a summing amplifier at its input with said fixed and variable components being provided as inputs to said amplifier and being superimposed thereby.

7. The arrangement according to claim 5 wherein each of said control unit includes a summing amplifier at its input with said fixed and variable voltage components being provided as inputs to said amplifier and being superimposed thereby.

8. The arrangement according to claim 3 and further including:
   a. means for measuring actual reactive power;
   b. means for pre-setting a nominal reactive power value; and
   c. means to develop said control voltages as a function of the deviation between the preset nominal reactive power value and the actual reactive power value.

9. The arrangement according to claim 7 and further including:
   a. means for measuring actual reactive power;
   b. means for presetting a nominal reactive power value; and
   c. means to develop said control voltages as a function of the deviation between the preset nominal reactive power value and the actual reactive power value.

10. The invention according to claim 3 wherein said A-C system is used to supply an arc furnace.

11. The arrangement according to claim 3 wherein said control units provide firing pulses at a control angle which is directly proportional to a control voltage input and said means providing first and second control voltages thereby provide a control voltage resulting in control angles which differ from each other, except for a common control range limit, and are such that their sum is alway smaller than 180° by a predetermined angular amount proportional to said first predetermined value.

* * * * *

UNITED STATES PATENT AND TRADEMARK OFFICE
CERTIFICATE OF CORRECTION

PATENT NO. : 3,900,792
DATED : August 19, 1975
INVENTOR(S) : GOTTFRIED MOLTGEN

It is certified that error appears in the above-identified patent and that said Letters Patent are hereby corrected as shown below:

in column 2, line 68, change "$\alpha_1 \neq \alpha_2$" to --$\alpha_1 = \alpha_2$-- in column 3, line 25, change "connected connected" to --series connected-- in column 4, line 44, change "the angles 60 1" to --the angles $\alpha_1$-- in column 5, line 12, formula should read
--$\alpha_1 + \alpha_2 = 180° - 2\delta$-- line 34, change " 12" to --12°-- line 51, change "value of $2_1$" to --value of $\alpha_1$-- line 64, change "(90°90 - $\delta$)" to --(90° - $\delta$)-- in column 6, line 21, change formula to read
--(90° - $\delta$) = 84°--
line 25, change "angle $\alpha$" to -- angle $\alpha$ --
line 57, change "visible" to --variable-- in column 7, line 15, change "D-C $I_d$" to --D-C $I_d$ current-- line 47, formula should read
--components -u ($\Delta$) and +u ($\Delta$)-- in column 8, line 24, change "iand" to --and--
line 26, change "eqality" to --equality--

Signed and Sealed this sixth Day of January 1976

[SEAL]

Attest:

RUTH C. MASON
*Attesting Officer*

C. MARSHALL DANN
*Commissioner of Patents and Trademarks*